United States Patent [19]

Sato et al.

[11] Patent Number: 4,731,299
[45] Date of Patent: Mar. 15, 1988

[54] COMPOSITE MAGNETIC MATERIAL

[75] Inventors: Kazuhiko Sato; Satoshi Miyaguchi; Miroyuki Ota, all of Saitama, Japan

[73] Assignee: Pioneer Electronic Corporation, Tokyo, Japan

[21] Appl. No.: 793,385

[22] Filed: Oct. 31, 1985

[30] Foreign Application Priority Data

Oct. 31, 1984 [JP] Japan ................................ 59-229460
Oct. 31, 1984 [JP] Japan ................................ 59-229461

[51] Int. Cl.$^4$ ............................................ H01F 1/00
[52] U.S. Cl. ...................................... 428/611; 428/632; 428/633; 428/928; 360/125; 360/126; 360/127
[58] Field of Search ............... 428/611, 632, 633, 928; 360/125, 126, 127

[56] References Cited

U.S. PATENT DOCUMENTS 4,409,633 10/1983 Watanabe et al. ................. 360/127
4,602,307 7/1986 Toriu et al. ......................... 360/125

*Primary Examiner*—John P. Sheehan
*Attorney, Agent, or Firm*—Sughrue, Mion, Zinn, Macpeak & Seas

[57] ABSTRACT

A composite magnetic material and a magnetic head made from this composite magnetic material formed of a combination of a body of a magnetic metal material and a magnetic oxide material joined together in such a manner as to provide improved strength while attaining an improved manufacturability and regenerative sensitivity at high frequencies. In accordance with the invention, the two bodies are joined together with a thin magnetic metal film initially formed on the oxide material body by vapor deposition or sputtering. The thin magnetic metal film can be made of the same material as the magnetic metal material body.

12 Claims, 12 Drawing Figures

COMPOSITE MAGNETIC MATERIAL

BACKGROUND OF THE INVENTION

The present invention relates to a composite magnetic material composed of different types of magnetic materials joined together.

More specifically, the invention relates to a composite magnetic material formed as a laminate of an oxide magnetic material such as polycrystalline ferrite and a magnetic metal material such as monocrystalline Sendust. Further, the invention relates to a magnetic head having a magnetic core constructed of such composite magnetic materials joined together so as to form a magnetic head capable of magnetic recording on high coercive recording media while providing excellent high-frequency characteristics.

With the advance of electronic technology, laminated composite magnetic materials have gained a general currency in various fields of technology and are playing an important role in the field of magnetic heads used in magnetic recording.

Ferrite, which is typical of oxide magnetic material, has been used to construct magnetic cores of magnetic heads for video tape recorders (VTRs) and magnetic disc reading/writing units for use with magnetic tapes and discs, respectively, the latter including flexible ("floppy") discs. The reason for this is that oxide magnetic materials provide a high magnetic permeability in a high-frequency range (several MHz) and excellent abrasion resistance.

Recently, high coercive force recording media represented by, for instance, metal tapes and vapor-deposited metal tapes, have been developed to meet high density magnetic recording requirements. This development has been accompanied by the extensive development of magnetic materials for magnetic heads capable of use with such high coercive force recording media.

The magnetic core of the magnetic head is mainly prepared from a magnetic material, and oxide magnetic materials such as ferrite are typically used. However, as the saturation magnetic flux density of the oxide magnetic material is about 5,000 gauss, a magnetic head constructed of such a material is unusable for magnetic storage on a high coercive force recording medium having a coercive force of more than 1,000 oersteds.

Attempts have been made to use for a magnetic head a magnetic core made of a magnetic material such as Sendust having a high saturation magnetic flux density. However, the disadvantage is that, when such a magnetic metal material is used to form a magnetic head, the regenerative sensitivity of the magnetic head is reduced because of eddy-current losses in the high-frequency range.

Since a magnetic head having a magnetic core constructed of simple magnetic materials has various disadvantages, there has been proposed a magnetic head using a composite magnetic material, as shown in FIG. 1. In this magnetic head, a laminated composite magnetic material is used for the magnetic core, namely, a magnetic metal core 11 made of Sendust is sandwiched between oxide magnetic cores 12 made of ferrite to compensate for certain magnetic characteristics in the high-frequency range and improve the regenerative sensitivity of the head. The three cores are joined with silver solder.

However, such a composite magnetic material used as a magnetic core has disadvantages including a reduction in strength and difficulties in manufacture as there is required a process for sandwiching the magnetic metal core 11 between the oxide magnetic cores 12 before they are soldered.

SUMMARY OF THE INVENTION

In view of the foregoing, it is an object of the present invention to provide a composite magnetic material composed of a metal material and oxide magnetic materials, the former and the latter being soldered together, with the composite material having an improved joint strength and manufacturability.

It is another object of the present invention to provide a magnetic head with improved manufacturability and regenerative sensitivity in high-frequency ranges.

These, as well as other objects of the invention, are met by a composite magnetic material and a magnetic head produced from this composite magnetic material including a first body made of a magnetic metal material and a second body made of an oxide magnetic material joined together by a thin magnetic film formed initially on said second body such as by vapor deposition or sputtering. The first body and the thin magnetic film may be made of the same material. The joined surfaces of the two bodies preferably have a mirrorlike smoothness. The thin magnetic film may be joined to the first body with solder.

DESCRIPTION OF THE PREFERRED EMBODIMENTS

Figure 1:
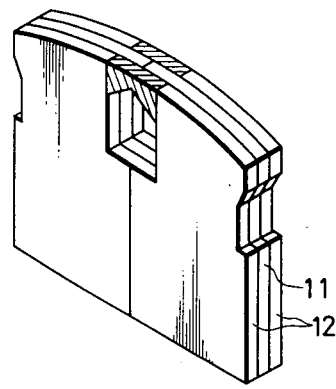
FIG. 1 is a perspective view of a magnetic core using a conventional composite magnetic material.

Referring now to the drawings, preferred embodiments of the present invention will be described.

Figure 2:
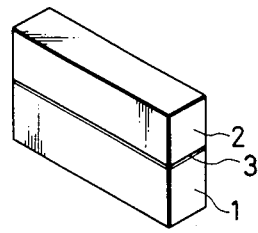
FIG. 2 is a perspective view of a composite magnetic material according to the present invention.

FIG. 2 is a perspective view of a composite magnetic material according to the present invention. In FIG. 2, the inventive composite magnetic material includes an oxide magnetic material block 1 made of ferrite, a magnetic metal material block 2 made of Sendust, and a thin magnetic metal film 3 made of Sendust sandwiched between the oxide magnetic material block 1 and the magnetic metal material block 2. The thin magnetic metal film 3 is initially vapor-deposited or formed by sputtering on the outside surface of the oxide magnetic material block 1. The thin magnetic metal film 3 and the magnetic metal material block 2 are then joined together with, for instance, silver solder to construct a composite magnetic material block composed of the oxide magnetic material block 1 and the magnetic metal material block 2.

A process for producing the above-described composite magnetic material (block) will subsequently be described.

Figure 3A:
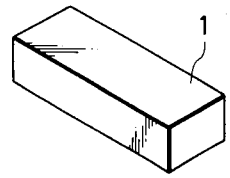
FIGS. 3A, 3B and 4 illustrates a process for producing the composite magnetic material according to the present invention.
Figure 3B:
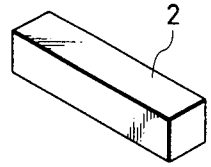
Figure 4:
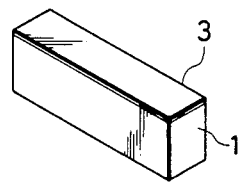

As shown in FIGS. 3A and 3B, one side of each of the oxide magnetic material block 1 and the magnetic metal material block 2 is ground with diamond polish to provide a mirrorlike smooth surface. Then, as shown in FIG. 4, a thin metal film 3 having the same constitution as the magnetic metal material block 2 is formed on the mirrorlike surface of the oxide magnetic material block 1, and the thin magnetic metal film 3 is joined to the mirrorlike surface of the magnetic metal material block 2 with solder and so as to obtain a composite magnetic material block.

Although it is extremely difficult in general to solder Sendust and magnetic materials such as ferrite, the joint strength of the oxide magnetic material and the magnetic metal material can be improved by forming a thin magnetic metal film on the oxide magnetic material as a constituent of the composite magnetic material.

In the above-described embodiment, although the magnetic metal material (block) 2 was stated as being composed of the same material as that of the magnetic metal film 3, any magnetic metal material may be used. That is, if Sendust is used as the magnetic metal material 2, the thin magnetic metal film 3 may be prepared from a metal material such as Permalloy or Alperm as well as Sendust.

Figure 5:
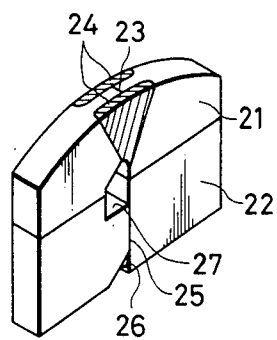
FIG. 5 is a perspective view illustrating the construction of a magnetic head according to the present invention.

FIG. 5 is a perspective view of the magnetic core of a magnetic head, the magnetic core being constructed of the composite magnetic material of FIG. 2. In FIG. 5, there is shown a magnetic circuit including a front magnetic core 21 produced from a monocrystalline magnetic metal material such as Sendust and a rear magnetic core 22 made from a polycrystalline oxide magnetic metal such as ferrite. There is provided an actuating gap 23 in the magnetic core 21 through a non-magnetic layer, which actuating gap 23 is filled with glass 24 for regulating the track width thereof. Moreover, the rear magnetic core 22 has with a rear magnetic gap 25 filled with glass 26. Reference numeral 27 designates a window through which a coil is wound, the window being formed between the front magnetic core 21 and the rear magnetic core 22. The front magnetic core 21 and the rear magnetic core 22 are combined with a thin magnetic metal film prepared from a magnetic metal material such as Sendust, Permalloy or Alperm vapor-deposited or formed by sputtering on the rear magnetic core 22 and then joined to the front magnetic core 21 with solder.

The magnetic metal material and the oxide magnetic material are thus combined to form an integral magnetic core, which is then properly machined to provide a magnetic head. Thus, no complicated laminating process is needed and hence the manufacturability of the core is substantially improved.

As the front magnetic core 21 having the actuating gap 23 and the rear magnetic core 22 are respectively prepared from a magnetic metal material and a oxide magnetic material, a reduction in regenerative sensitivity for higher frequency ranges is achieved.

Figure 6A:
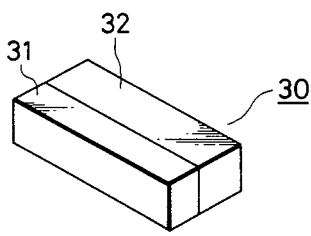
FIGS. 6A through 8 illustrate a process for producing the magnetic head according to the present invention.
Figure 6B:
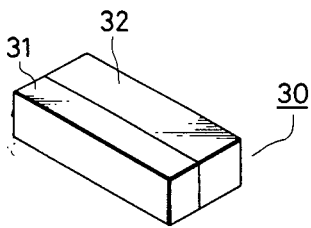
Figure 6C:
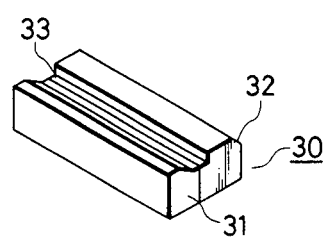
Figure 7A:
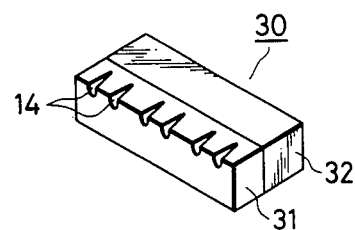
Figure 7B:
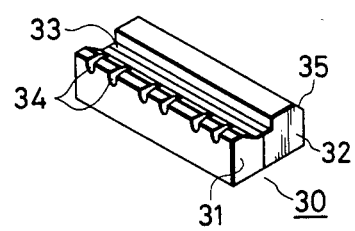
Figure 8:
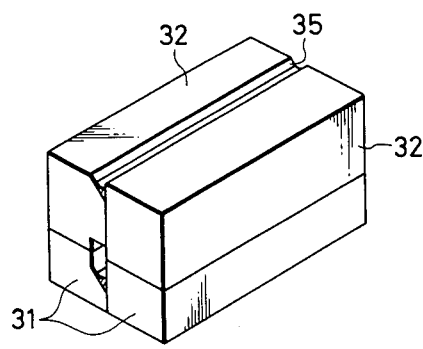

FIGS. 6A through 8 illustrate a process for producing the above-described magnetic head. As shown in FIGS. 6A and 6B, the magnetic metal material block 11 and the oxide magnetic material block 12 are first joined together as illustrated in FIGS. 2 to 4 to prepare core block halves 30, and a longitudinal wire-receiving groove 33 is formed in one of the block halves 30.

Subsequently, grooves 34 for regulating the track width are formed in the direction perpendicular to the longitudinal direction of the core block halves 30, and a cutaway portion 35 is made in one side edge of one core block half 30. The faces of the core block halves 30 with the grooves 34 for regulating the track width are polished to finish the faces to a mirrorlike state (see FIG. 7).

The core block halves 30 thus finished are placed in abutment in such a manner as to provide a predetermined gap length through a non-magnetic layer. Then, molten glass is poured into the wire-receiving groove 33, the grooves 34 for regulating the track width, and the cutaway portion 35 to obtain the composite magnetic core block (see FIG. 8).

The magnetic core block thus obtained, after the magnetic metal material block side is subsequently ground to a predetermined configuration, is cut by a blade or wire saw into head chips, as shown in FIG. 5.

FIG. 5 exemplifies the construction of a magnetic core prepared from the composite magnetic material according to the present invention.

The invention is of course also applicable to the construction of the magnetic core (laminated core) of a conventional magnetic head of the type shown in FIG. 1.

As set forth above, the magnetic metal material is soldered to the oxide magnetic material of the composite magnetic material according to present invention, the composite magnetic material including the magnetic metal material and the oxide magnetic material joined thereto. Accordingly, the oxide magnetic material can be readily joined to the magnetic metal material while attaining a significantly improved joint strength.

Moreover, the front magnetic core having the actuating gap and the rear magnetic core soldered to the front magnetic core are used to constitute a magnetic head for forming a magnetic circuit, the front and rear magnetic cores being respectively prepared from a magnetic metal material and an oxide magnetic material. Accordingly, because the combination of the magnetic metal material and the oxide magnetic material can be treated as a single magnetic core during the machining process, there are obtained, with the use of the invention, magnetic heads readily mass producible with excellent regenerative sensitivity in high-frequency ranges.

What is claimed is:

1. In a composite magnetic material including a first body (2) made of a magnetic metal material and a second body (1) made of an oxide magnetic material joined together, the improvement comprising a thin magnetic film (3) formed on said second body, and fastening means for joining said second body, having said thin magnetic film, to said first body, said fastening means being disposed between said film and said first body.

2. The composite magnetic material of claim 1, wherein said first body and said thin magnetic film are made of the same material.

3. The composite magnetic material of claim 1, wherein joined surfaces of said first and second bodies have a mirrorlike smoothness.

4. The composite magnetic material of claim 1, wherein said fastening means comprises solder.

5. The composite magnetic material of claim 1, wherein said first body and said thin magnetic film are made of Sendust and said second body is made of ferrite.

6. The composite magnetic material of claim 1, wherein said first body is made of Sendust, said thin magnetic film is made of a material selected from the group consisting of Permalloy and Alperm, and said second body is made of ferrite.

7. In a composite magnetic material including a first body (2) made of a magnetic metal material and a second body (1) made of an oxide magnetic material joined together, the improvement comprising a thin magnetic film (3) formed on said second body, and fastening means for joining said second body, having said thin magnetic film, to said first body, said fastening means being disposed between said film and said first body, wherein said thin magnetic film on said second body is formed by one of vapor deposition and sputtering.

8. A magnetic head comprising: a front core having a thin magnetic film thereon, a rear core, and fastening means for joining said front core at said film to said rear core to form a magnetic circuit, said front core being made of a magnetic metal material and said rear core being made of an oxide magnetic material.

9. The magnetic head of claim 8, wherein said front core and said thin magnetic film are made of the same material.

10. The magnetic head of claim 8, wherein said fastening means comprises solder.

11. The magnetic head of claim 8, wherein said front core and said thin magnetic film are made of Sendust and said rear core is made of ferrite.

12. The magnetic head of claim 8, wherein said front core is made of Sendust, said thin magnetic film is made of a material selected form the group consisting of Permalloy and Alperm, and said rear core is made of ferrite.

* * * * *